United States Patent [19]
Green

[11] Patent Number: 5,989,016
[45] Date of Patent: Nov. 23, 1999

[54] HIGH EFFICIENCY PHOTOGRAPHIC FLASH LAMP

[75] Inventor: Warren Green, North Chili, N.Y.

[73] Assignee: Eastman Kodak Company, Rochester, N.Y.

[21] Appl. No.: 08/940,081

[22] Filed: Sep. 29, 1997

[51] Int. Cl.⁶ ...................................................... F21K 5/06
[52] U.S. Cl. .............................. 431/361; 431/358; 362/3; 362/159
[58] Field of Search ..................................... 431/357, 358, 431/361, 365; 102/204; 362/3, 159; 313/317, 318.07

[56] References Cited

U.S. PATENT DOCUMENTS 2,504,504  4/1950  Despois ..................................... 313/317
3,625,641  12/1971  Shaffer ..................................... 431/361
4,201,540  5/1980  Waymouth et al. ..................... 431/361

FOREIGN PATENT DOCUMENTS 20 34 328  1/1972  Germany .
465021  4/1937  United Kingdom ................... 431/358
1446658  8/1976  United Kingdom .

*Primary Examiner*—Alan Cariaso
*Attorney, Agent, or Firm*—Gordon M. Stewart; Frank Pincelli

[57] ABSTRACT

A photographic flash lamp having an envelope defining a chamber, at least a portion of the envelope being transparent. A support mesh is positioned within the chamber and has a first portion out of contact with the remainder of the lamp. Suitable combustible material to produce the flash, is adhered to the first portion of the mesh to generate a flash upon ignition. An ignitor ignites the combustible material.

8 Claims, 2 Drawing Sheets

HIGH EFFICIENCY PHOTOGRAPHIC FLASH LAMP

FIELD OF THE INVENTION

This invention relates generally to the field of photography, and in particular to photographic flash lamps used for producing a flash of light during picture taking.

BACKGROUND OF THE INVENTION

The use of various means to produce a flash during exposure of a photographic image, is well known. Currently, electronic flash units using xenon or the like, flash tubes, are typically used. While such electronic flash units are reliable and produce many flashes during their lifetime, they represent a substantial fixed cost component of the camera. For most cameras, this is not a problem since, compared to the rest of the camera components, the fixed cost of an electronic flash unit is relatively low and so does not influence the price of the camera much.

In recent years though, so called "single use cameras" (sometimes referred to as "film with lens" or similar terms) have become available. These cameras are sold to the end user with film pre-loaded in them, and are provided with an associated indication (usually in express written instructions on them) that the entire camera is to be returned to a processor for processing of the film. At the processor, the film is removed for processing but the camera is not returned to the user (often they are repaired as necessary and re-loaded with film for sale as a single use camera again). It is necessary in such camera to keep component cost as low as possible. In such single use cameras or other low cost cameras, the fixed cost of an electronic flash unit represents a substantial proportion of the overall camera cost which it would be desirable to reduce.

Combustion flash units which produce a flash by rapid combustion of a suitable material, were well known historically. Ignition of the combustible material was timed to occur close to the opening of a camera shutter to expose a photographic film. An encapsulated form of such a combustion flash is disclosed, for example, in GB 1,446,658. In this device, a combustible tissue or mesh is shaped the same as the bulb of the flash unit and disposed to be "bearing against the bulb wall". A difficulty with combustion flash units is that ignition and combustion of the combustible material requires a relatively long time in comparison to the duration of an electronic flash. This means that for relatively short film exposures, much of the light is wasted with the by-production of unnecessary combustion products (particularly combustion gasses) and heat.

It would be desirable then to provide a combustion flash unit in which combustion to produce the flash, takes place relatively rapidly and in which light generation efficiency is relatively high.

SUMMARY OF THE INVENTION

The present invention realizes than the cost of a single use camera can be reduced by the use of a combustible type photographic flash, and that it is important to keep ignition duration low and light output high over the short ignition duration. The present invention further realizes that in order to accomplish this, various compositions can be used but that these should be have minimal contact with other portions of the flash in order to reduce conduction of heat away from portions of the ignited output (with resulting longer ignition durations and lowered light output).

The present invention then, provides a photographic flash lamp comprising:

an envelope defining a chamber, at least a portion of the envelope being transparent;

a support mesh positioned within the chamber and having a first portion out of contact with the remainder of the lamp;

a combustible material adhered to the first portion of the mesh to generate a flash upon ignition; and an ignitor to ignite the combustible material.

In the described flash unit, a powdered combustible material can be adhered in position on the mesh while maintaining the combustible material out of contact with anything other than the supporting mesh. This allows use of powdered combustion materials while maintaining a low combustion heat loss to lamp components, resulting in a rapidly generated flash with high light generation efficiency. The mesh can be oriented with respect to the ignitor to simultaneously provide rapid ignition, high light output directed toward a scene to be photographed, and a low flash lamp profile (that is, thickness).

BRIEF DESCRIPTION OF THE DRAWINGS

To facilitate understanding, identical reference numerals have been used, where possible, to designate identical elements that are common to the figures.

DETAILED DESCRIPTION OF THE INVENTION

In the present invention it will be understood that by "combustible material" is referenced a material which is either oxidized itself or acts as an oxidant, or both. An "envelope" references the wall or walls s defining the chamber.

Figure 1:
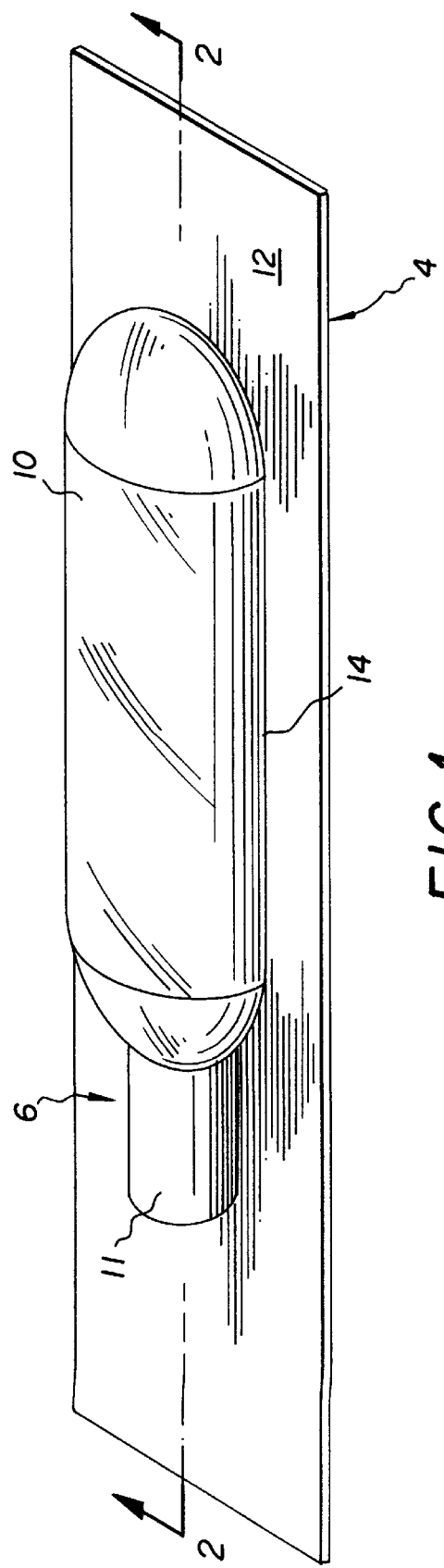
FIG. 1 is a perspective view of a photographic flash lamp of the present invention.
Figure 2:
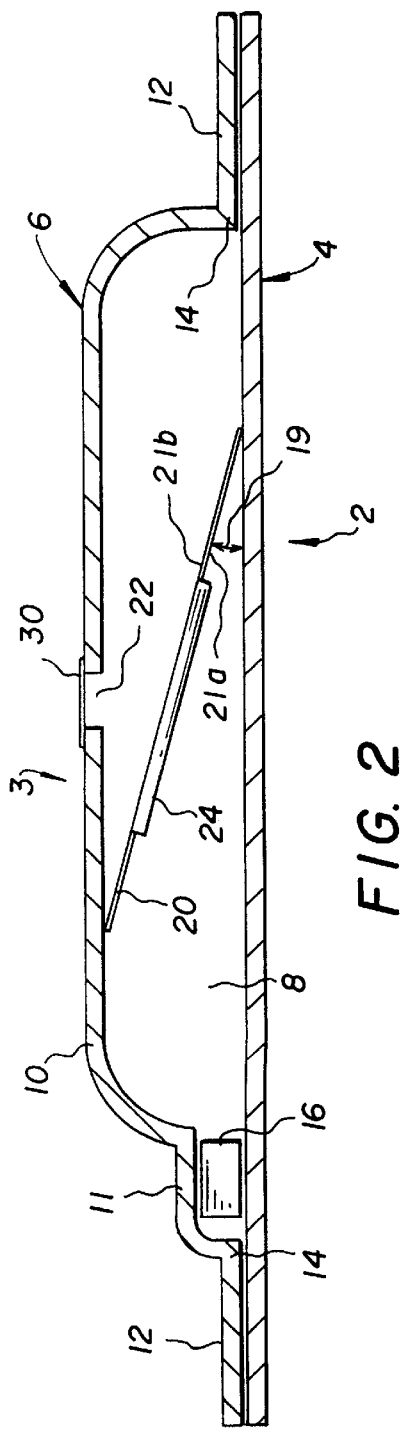
FIG. 2 is a cross-section along the line 2—2 of FIG. 1.
Figure 3:
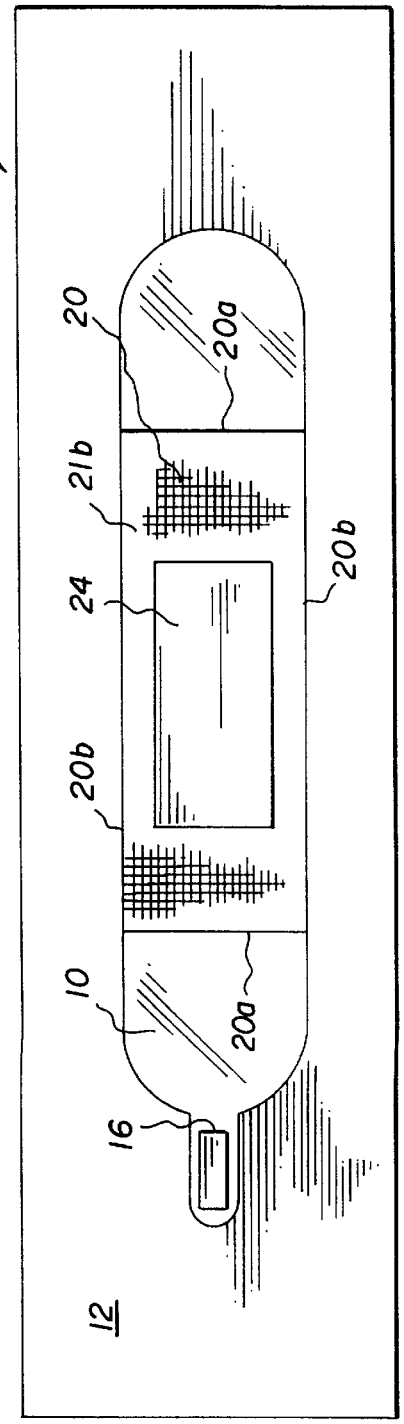
FIG. 3 is a top plan view of the lamp of FIG. 1.

Referring to FIGS. 1 and 2, the shown photographic flash lamp 2 has an envelope formed of a first transparent integral plastic sheet 6 and a second transparent integral plastic sheet 4. A raised first portion 10 of the first sheet 6 is formed in the shape of a bubble to be spaced apart from the second sheet 4. A flat second portion 12 of first sheet 6 abuts the second sheet 4. Thus, a chamber 8 is defined between the first and second sheets 6 and 4, respectively. Portion 12 of first sheet 6 is sealed to second sheet 4 at least around a boundary 14 of second portion 12, and preferably the entire first portion 12 is sealed to second sheet 4. A suitable adhesive can be used for the sealing. Raised portion 10 defines a front 3 of flash lamp 2. That is, in normal use front 3 is oriented to face the scene to be illuminated by the flash. Sheet 6 can, for example, be an acrylic sheet of about 0.015 to 0.030 inches in thickness.

Raised first portion 10 includes a raised shoulder 11 on one side of chamber 8, beneath which a suitable percussion ignitor charge 16 is adhered to first sheet 6. Ignitor charge 16 can be ignited by a strike to the envelope (particularly to shoulder portion 11) from the exterior of chamber 8. Raised first portion 10 has a central, generally circular, opening 22 across which is provided fusible transparent sheet segment 30, for purposes which will become apparent. Within chamber 8 is disposed a substantially flat, rectangular wire mesh 20 which extends into chamber 8 from two opposite edge portions 20a and two opposite edge portions 20b, of the mesh. One of the edge portions 20a is adhered to sheet 6 while the other one is adhere to sheet 4. Edge portions 20b are adhered to sheet 6. Mesh 20 extends from one side of chamber 8 (that is, from sheet 6) above ignitor charge 16, at a slight downward slope toward the other side of chamber 8 (that is, to sheet 4) so that a lower side 21a of mesh 20 (as viewed in FIG. 2) faces at an angle 19 of greater than 0 and less than 90 degrees (such as between 20 to 60 degrees) toward charge 16 while an upper side 21b faces toward a front of the flash.

A combustible material 24 is adhered to a first portion of support mesh 20, which first portion is out of contact with the remainder of the flash lamp. Thus, combustible material 24 coats only a portion of mesh 20 intermediate the envelope and is out of contact with anything other than mesh 20. The coating is of a thickness such that the openings in mesh 20 are still open. This arrangement also retains large surface to volume ratio of the combustible material. Combustible material 24 can be of any suitable material, and particular it may be formed from a mixture of any suitable powdered oxidizer, powdered fuel and binder, which mixture is then coated on mesh 20. Suitable compositions are described, for example, in U.S. Ser. No. 08/769,338 filed Dec. 19, 1996 by K. Papadopoulos and assigned to Eastman Kodak Company. That application and all other references cited herein, are incorporated by reference. One particular composition can be prepared by mixing 130 mg zirconium powder (3 micron), 350 mg zirconium 325 mesh; 375 mg potassium perchlorate, 0.5 mL of water and a binder. Approximately 7–17 microliters of this mixture is applied to mesh 20. Mesh 20 itself may be made of a suitable combustible material, such as zirconium wires which are interwoven to leave the small spaces of the mesh between them. As to ignitor charge 16, useful compositions are described in U.S. Pat. No. 3,625,641. One particularly useful composition is made from the following relative weights of components: 33 potassium chlorate; 16 phosphorous; 51 aluminum oxide; and 0.5 of a binder. 10–20 mg. (for example, about 15 mg.) of the resulting mixture is applied to the middle of mesh 20.

In operation, at about the time a camera shutter is opened, a suitable striker in a camera (not shown) is activated by a suitable mechanism to strike shoulder portion 11 of the first sheet 6 and ignite percussion ignited charge 16. Sparks form the foregoing ignition in turn ignite combustible material 24. The angle at which mesh 20 and hence combustible material 24 is disposed to face charge 16, presents a relatively large surface area facing charge 16. As a result, more than one spot on combustible material 24 can be ignited simultaneously to thereby promote rapid combustion of material 24 while still having the combustible material face generally toward the front 3 of flash lamp 2. This permits flash lamp 2 to be relatively thin (that is, the space between portion 10 and sheet 4 is relatively small). Typical dimensions for the chamber 8 of the flash lamp are about 0.5 to 2.0 cm in length, 0.25 to 1.0 cm in width, with a volume of about 0.5 to 1.0 cubic centimeters. Also, since combustible material 24 is in contact only with mesh 20, no other surfaces can act as a heat absorber for the resulting combustion and thereby decrease the rate and total amount of light released during flash combustion of material 24.

The invention has been described in detail with particular reference to certain preferred embodiments thereof, but it will be understood that variations and modifications can be effected within the spirit and scope of the invention.

| | |
|---|---|
| 2 | flash lamp |
| 3 | front |
| 4 | second sheet |
| 6 | first sheet |
| 8 | chamber |
| 10 | first portion |
| 11 | raised shoulder |
| 12 | second portion |
| 14 | boundary |
| 16 | ignitor charge |
| 19 | angle |
| 20 | wire mesh |
| 20a | opposite edge portions |
| 20b | opposite edge portions |
| 21a | lower side |
| 21b | upper side |
| 22 | opening |
| 24 | combustible material |
| 30 | transparent sheet segment |

What is claimed is:

1. A photographic flash lamp comprising:

an envelope defining a chamber, at least a portion of the envelope being transparent, said envelope comprising a first integral sheet with a first portion spaced from a second integral sheet and a boundary around the first portion sealed to the second integral sheet to define the chamber therebetween;

a support mesh positioned within the chamber and having a first portion out of contact with the remainder of the lamp;

a combustible material adhered to the first portion of the mesh to generate a flash upon ignition; and an ignitor to ignite the combustible material, said ignitor is disposed within said chamber.

2. A photographic flash lamp according to claim 1 wherein the combustible material comprises a combustible powder composition adhered to the screen.

3. A photographic flash lamp according to claim 1 wherein the mesh is substantially flat and extends into the chamber from at least an edge portion of the mesh which is connected to the envelope.

4. A photographic flash lamp according to claim 3 wherein the mesh is connected to the envelope at opposite ends.

5. A photographic flash lamp according to claim 3 wherein the mesh faces the ignitor at an angle of between 20 to 60 degrees.

6. A photographic flash lamp according to claim 1 wherein the ignitor is a percussion material positioned to be ignited by a strike to the envelope from the exterior of the chamber.

7. A photographic flash lamp according to claim 2 wherein the combustible powder composition comprises a combustible material, an oxidant, and a binder.

8. A photographic flash lamp according to claim 1 wherein the first and second sheets are both transparent.

\* \* \* \* \*